United States Patent
Jeol et al.

(10) Patent No.: US 9,873,792 B2
(45) Date of Patent: Jan. 23, 2018

(54) POLYAMIDE COMPOSITION

(71) Applicant: RHODIA OPERATIONS, Aubervilliers (FR)

(72) Inventors: Stéphane Jeol, Cumming, GA (US); Thierry Badel, Lyons (FR)

(73) Assignee: Rhodia Operations, Aubervilliers (FR)

( * ) Notice: Subject to any disclaimer, the term of this patent is extended or adjusted under 35 U.S.C. 154(b) by 38 days.

(21) Appl. No.: 14/906,321

(22) PCT Filed: Jul. 22, 2014

(86) PCT No.: PCT/EP2014/065678
§ 371 (c)(1),
(2) Date: Jan. 20, 2016

(87) PCT Pub. No.: WO2015/011121
PCT Pub. Date: Jan. 29, 2015

(65) Prior Publication Data
US 2016/0168380 A1 Jun. 16, 2016

(30) Foreign Application Priority Data

Jul. 23, 2013 (EP) .................................... 13306060

(51) Int. Cl.
| | |
|---|---|
| C08K 3/40 | (2006.01) |
| C08L 77/06 | (2006.01) |
| C08L 77/00 | (2006.01) |
| C08L 77/02 | (2006.01) |
| C08L 77/12 | (2006.01) |
| B29C 43/00 | (2006.01) |
| B29C 45/00 | (2006.01) |
| B29C 49/00 | (2006.01) |
| B29C 51/00 | (2006.01) |
| C08K 5/053 | (2006.01) |
| C08K 7/14 | (2006.01) |
| B29K 77/00 | (2006.01) |
| B29L 31/00 | (2006.01) |

(52) U.S. Cl.
CPC .............. *C08L 77/06* (2013.01); *B29C 43/00* (2013.01); *B29C 45/00* (2013.01); *B29C 49/00* (2013.01); *B29C 51/00* (2013.01); *C08L 77/00* (2013.01); *C08L 77/02* (2013.01); *C08L 77/12* (2013.01); *B29K 2077/00* (2013.01); *B29L 2031/00* (2013.01); *C08K 5/053* (2013.01); *C08K 7/14* (2013.01); *C08L 2201/08* (2013.01); *C08L 2205/02* (2013.01)

(58) Field of Classification Search
None
See application file for complete search history.

(56) References Cited

U.S. PATENT DOCUMENTS

| | | | | |
|---|---|---|---|---|
| 5,929,178 A | * | 7/1999 | Shida | ........................ C08K 3/16 428/357 |
| 6,160,080 A | | 12/2000 | Cucinella et al. | |
| 6,525,166 B1 | | 2/2003 | Di Silvestro et al. | |
| 2009/0149590 A1 | * | 6/2009 | Eroshov | ................. C08G 69/14 524/417 |
| 2010/0029819 A1 | * | 2/2010 | Palmer | ................. C08G 69/265 524/387 |
| 2012/0177858 A1 | | 7/2012 | Topoulos | |

FOREIGN PATENT DOCUMENTS

| | | |
|---|---|---|
| CN | 102112525 A | 6/2011 |
| WO | 9724388 A1 | 7/1997 |
| WO | 1999/64496 A1 | 12/1999 |
| WO | 2007/036929 A3 | 4/2009 |
| WO | 2011/014754 A1 | 2/2011 |
| WO | 2012/140100 A1 | 10/2012 |
| WO | 2013/033287 A2 | 3/2013 |

OTHER PUBLICATIONS

English abstract of WO 2010/014801 A1, Feb. 4, 2010, WIPO, 11 pages.*
PCT International Search Report and Written Opinion dated Dec. 8, 2014, issued by the European Patent Office in related International Application No. PCT/EP2014/065678 (11 pages).
PCT International Preliminary Report on Patentability (IPRP) and Written Opinion dated Jan. 26, 2016, by the International Bureau of WIPO in related International Application No. PCT/EP2014/065678 (7 pages).
First Office Action dated Feb. 3, 2017, issued by the State Intellectual Property Office of People's Republic of China in related Chinese Patent Application No. CN-201480042070.1, with USPTO Global Dossier English translation (19 pages).

* cited by examiner

*Primary Examiner* — Tae H Yoon
(74) *Attorney, Agent, or Firm* — Osha Liang LLP

(57) ABSTRACT

The invention pertains to filled polyamide compositions [composition (C)] comprising: —at least one polyhydric alcohol-modified polyamide, comprising an amount of polyhydric alcohol (PHA, herein after) residues chemically bonded at least to a part of the polyamide [polyamide (A)] of at least 0.1% wt (based on the total weight of polyamide (A)); —at least one filler [filler (F)]; and—at least one polyamide, different from polyamide (A), more than 50% moles of recurring units thereof being of formula —HN—$(CH_2)_5$—CO— [polyamide (PA6)], in an amount of 5 to 50% wt, based on the combined weight of polyamide (A) and polyamide (PA6).

20 Claims, No Drawings

POLYAMIDE COMPOSITION

CROSS-REFERENCE TO RELATED APPLICATION

This application is a U.S. national stage entry under 35 U.S.C. §371 of International Application No. PCT/EP2014/065678, filed Jul. 22, 2014, which claims priority to European Application No. 13306060.8 filed on Jul. 23, 2013. The entire content of each of these applications is hereby incorporated herein by reference.

TECHNICAL FIELD

The present invention relates to the field of polyamide compositions having improved long term high temperature aging characteristics.

BACKGROUND ART

Polyamides are synthetic polymers widely used for the manufacture of diverse shaped articles, including moulded and injected parts, which are often proposed for high the electro-, electronic, and automotive industry.

In these fields of use, the moulded polyamide article during its normal useful lifetime is in contact with a heat source which frequently attains and/or which attains for a longer period temperatures largely exceeding 100° C. The heat source may be a heat producing device or a heated device or may be the surrounding environment wherein the moulded article is placed. Examples of heated devices or heat generating devices are engines, or elements thereof, and electronic devices such as semiconductors. For the automotive segment high-temperature-use application are regularly found in so-called under-the-hood or under-the-bonnet applications, herein referred to as high temperature automotive applications. Therefore, the invention in particular relates to polyamide suitable for the manufacture of moulded articles for use in the electro-, electronic, and automotive industry.

Moulded articles for the electro, electronic and automotive industry and moulding compositions based on polyamides generally have to comply with a complex property profile, including, for the compositions as moulded, good dimensional stability, high heat distortion temperature (HDT) and good mechanical properties, such as a high tensile strength, tensile modulus and fatigue. Polyamide materials generally tend to show a decrease in mechanical properties due to thermal degradation of the polymer. This effect is called heat ageing. This effect can occur to an undesirable extent. In particular with polyamides as the thermoplastic polymer, the deteriorating effect of exposure to high temperatures can be very dramatic.

In attempts to improve heat aging characteristics, it has been conventional practice to add heat stabilizers to polyamide compositions. The function of a heat stabilizer is to better retain the properties of the composition upon exposure of the moulded article to elevated temperature. When using a heat stabilizer, the useful lifetime of the moulded material can be extended significantly, depending on the type of material, use conditions and type and amount of heat stabilizer. Examples of heat stabilizers typically used in polyamides are organic stabilizers, like phenolic antioxidants and aromatic amines, and copper, either in the form of a copper salt in combination with potassium iodide or potassium bromide, or in the form of elementary copper, and metal powders, in particular iron powders.

Existing technologies, while leading to improvements of long-term heat aging resistance, are nevertheless insufficient for more demanding applications, involving exposure to higher temperatures; in many applications, retention of mechanical properties after long-term exposure to temperatures as high as 160° C., or even 180-200° C. and higher becomes a basic requisite. The number of specialty applications, requiring compositions with improved heat ageing properties is also increasing.

The aim of the invention is therefore to provide polyamide compositions, which have better heat ageing properties than the known compositions, thereby providing for the possibility to make moulded articles that can be used at higher continuous use temperatures than the moulded articles prepared with the known compositions.

There hence remains a continuous need for polyamide compositions that are suitable for manufacturing articles and that exhibit good mechanical properties after long-term high temperature exposure.

Within this scenario, WO 2007/036929 (NILIT LTD) 5 Apr. 2007 discloses, notably, glass fiber reinforced polyamide compositions, wherein the polyamide is modified by a polyhydric alcohol chemically bonded at least to a part of the polyamide. This document is silent about heat aging properties of said compositions.

Further, US 2010029819 (DU PONT) 4 Feb. 2010 teaches that glass fiber reinforced polyamide compositions comprising one or more polyamide, and one or more polyhydric alcohol (in amount of 0.25 to 15% wt), and optionally a polymeric toughener deliver improved thermal resistance. Among blends of polyamides which can be used, mention is specifically made (see paragraph [0082]) of a blend of PA6 and PA66/6T. The sole polyamide blends exemplified are (i) a blend of PA66/6T and PA6, combined, notably, with glass fibers and 1.5% wt dipentaerythritol, this latter added during compounding, and (ii) a blend of PA66 and PA6T/DT (i.e. a copolyamide of terephthalic acid, hexamethylenediamine, and 2-methyl-pentamethylenediamine) combined, notably, with glass fibers and 3% wt tripentaerythritol, equally added during compounding.

Still, WO 2012/140100 (RHODIA OPERATIONS) 18 Oct. 2012 is directed to the use of polyhydric alcohols in polymerization of polyamides, so as to manufacture polyamide modified by incorporation in the polymer chain of said polyhydric alcohols, for achieving thermal stabilization of the polyamide. Hence, it discloses polyamides modified by a polyhydric alcohol chemically bound to the polyamides, which can be formulated with fillers and impact modifiers.

The Applicant has now found that by the incorporation in reinforced compounds based on polyamides modified with polyhydric alcohols of certain amounts of a polyamide of PA6-type is effective in delivering outstanding synergetic heat aging stability effect, in particular delivering outstanding retention of mechanical properties even after long term exposure to temperatures as high as 210° C.

SUMMARY OF INVENTION

The invention thus pertain to a filled polyamide composition [composition (C)] comprising:
  at least one polyhydric alcohol-modified polyamide, comprising an amount of polyhydric alcohol (PHA, herein after) residues chemically bonded at least to a part of the polyamide [polyamide (A)] of at least 0.1% wt (based on the total weight of polyamide (A));
  at least one filler [filler (F)]; and at least one polyamide, different from polyamide (A), more than 50% moles of recurring units thereof being of formula —HN—(CH$_2$)$_5$—CO— [polyamide (PA6)], in an amount of 5 to 50% wt, based on the combined weight of polyamide (A) and polyamide (PA6);

The Applicant has surprisingly found that the incorporation of polyamide (PA6) into the filled polyamide compound based on a PHA-modified polyamide enables unexpectedly improving heat aging performances at temperatures as high as 210° C., ensuring outstanding retention of mechanical properties, with substantially better performances over unmodified polyamides or PHA-modified polyamide free from PA6.

The Polyamide (A)

The inventive composition comprises at least one polyhydric alcohol-modified polyamide, comprising an amount of polyhydric alcohol (PHA, herein after) residues chemically bonded at least to a part of the polyamide [polyamide (A)] of at least 0.1% wt (based on the total weight of polyamide (A)).

The expression "polyhydric alcohol" and "PHA" is used within the context of the present invention for designating an organic compound containing three or more hydroxyl groups in the molecule. The PHA can be an aliphatic, cycloaliphatic, arylaliphatic or aromatic compound, and may comprise one or more than one heteroatoms, including N, S, O, halogen and/or P, and can comprise additional functional groups (other than hydroxyl groups) such as ether, amine, carboxylic acid, amide or ester groups.

According to preferred embodiments, the PHA will comply with formula

R—(OH)$_n$     (I)

wherein:
n is an integer of 3 to 8, and preferably 4 to 8; and
R is a C$_1$-C$_{36}$ hydrocarbon radical.

Generally, hydroxyl groups of the PHA are bound to aliphatic carbon atoms; in other terms, the PHA is generally not a phenol-type compound.

Further, in order to ensure appropriate reactivity of the hydroxyl groups of the PHA, it is generally preferred for said hydroxyl group of not being sterically hindered. To this aim, the carbon atoms in alpha position to the aliphatic carbon bringing the hydroxyl group are generally free from sterically hindered substituents, and more specifically free from branched aliphatic groups.

Compounds suitable for being used as PHA within the frame of the present invention are notably:
triols, in particularly selected from the group consisting of glycerol, trimethylolpropane, trimethylolbutane, 2,3-di(2'-hydroxyethyl)-cyclohexan-1-ol, hexane-1,2,6-triol, 1,1,1-tris(hydroxymethyl)ethane, 3-(2'-hydroxyethoxy)propane-1,2-diol, 3-(2'-hydroxypropoxy)-propane-1,2-diol, 2-(2'-hydroxyethoxy)-hexane-1,2-diol, 6-(2'hydroxypropoxy)-hexane-1,2-diol, 1,1,1-tris-[(2'-hydroxyethoxy)-methylethane, 1,1,1-tris-[(2'-hydroxypropoxy)-methyl-propane, 1,1,1-tris-(4'-hydroxyphenyl)ethane, 1,1,1-tris-(hydroxyphenyl)-propane, 1,1,5-tris-(hydroxyphenyl)-3-methylpentane, trimethylolpropane ethoxylate, trimethylolpropane propoxylate, tris(hydroxymethyl)aminomethane, N-(2-Hydroxy-1,1-bis(hydroxymethyl)ethyl)glycine (also know as tricine), and salts thereof;
tetraols, in particularly selected from the group consisting of diglycerol, di(trimethylolpropane), pentaerythritol, 1,1,4-tris-(dihydroxyphenyl)-butane;

polyols comprising 5 hydroxyl groups, in particular triglycerol;
polyols comprising 6 hydroxyl groups, in particular dipentaerythritol;
polyols comprising 8 hydroxyl groups, in particular tripentaerythritol;
saccharide-type polyols, in particular selected from the group consisting of cyclodextrine, D-mannose, glucose, galactose, sucrose, fructose, arabinose, D-mannitol, D-sorbitol, D- or L-arabitol, xylitol, iditol, talitol, altritol, gulitol, erythrol, threitol, D-gulono-1,4-lactone.

PHA which have been found to provide particularly good results within the frame of the present invention are diglycerol, triglycerol, pentaerythritol, dipentaerythritol (DPE), tripentaerythritol (TPE) and di(trimethylolpropane), with dipentaerythritol (DPE) and tripentaerythritol (TPE) being preferred, and dipentaerythritol (DPE) particularly preferred.

As said, the polyhydric alcohol-modified polyamide comprises polyhydric alcohol (PHA, herein after) residues chemically bonded at least to a part of the polyamide; the expression "bonded at least to a part of the polyamide" is intended to mean that at least a fraction of polyamide (A) molecules will comprise said PHA residues, for example coupled by ester bonds, while other polyamide (A) molecules maybe free from said chemically bonded PHA residues.

It is understood that one or more than one of the hydroxyl groups of said PHA may participate in the bonding to the polyamide (A) molecules. When two, three, or more, hydroxyl groups of said PHA participate in the bonding, the polyamide (A) may possess a copolymer and/or a branched structure.

Polyamide (A) is capable of being obtained by addition of a polyhydric alcohol having at least three hydroxyl functional groups to a polymerization medium, prior to or at any stage of the polymerization process.

It is nevertheless essential that the addition of the PHA is carried out before completion of the polycondensation reaction, so as to ensure that at least one of the hydroxyl function of the PHA is reacted, hence ensuring bonding of a PHA residue to the polyamide molecule.

More precisely, polyamide (A) is obtained by condensation reaction in the presence of said at least one PHA of at least one mixture selected from:
mixtures (M1) comprising at least a diacid [acid (DA)] (or derivative thereof) and at least a diamine [amine (NN)] (or derivatives thereof);
mixtures (M2) comprising at least a lactam [lactam (L)];
mixtures (M3) comprising at least an aminocarboxylic acid [aminoacid (AN)]; and
combinations thereof.

The amount of PHA used in the polymerization is generally of from 0.15 to 20% wt, preferably of 0.5 to 10% wt, more preferably of 1 to 5% wt, with respect to the total weight of the monomer mixture(s).

It is generally understood that the fraction of PHA which can be thus bound to the polyamide molecule is of at least 50% moles, preferably at least 70% moles, even more preferably at least 80% moles, with respect to the total moles of PHA used.

As a consequence, the polyamide (A) will possess a content of chemically bonded PHA residues of at least 0.1% wt, preferably of at least 0.5% wt, even more preferably at least 0.75% wt and of at most 10% wt, preferably of at most 7% wt, even more preferably of at most 5% wt, with respect to the weight of the polyamide (A).

Although the presence of free PHA in the polyamide (A) cannot be absolutely excluded, it is understood that the polyamide (A) will comprise, if any, non-chemically bonded PHA in an amount of less than 2% wt, preferably of less than 1.5% wt, more preferably of less than 1% wt, with respect to the weight of the polyamide (A).

Acid (DA) derivatives include notably salts, anhydride, esters and acid halides, able to form amide groups; similarly, amine (NN) derivatives include notably salts thereof, equally able to form amide groups.

Said acid (DA) can be an aromatic dicarboxylic acid comprising two reactive carboxylic acid groups [acid (AR)] or an aliphatic dicarboxylic acid comprising two reactive carboxylic acid groups [acid (AL)]. For the purpose of the present invention, a dicarboxylic acid is considered as "aromatic" when it comprises one or more than one aromatic group.

Non limitative examples of acids (AR) are notably phthalic acids, including isophthalic acid (IA), and terephthalic acid (TA), 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene, naphthalene dicarboxylic acids, including 2,6-naphthalene dicarboxylic acid, 2,7-naphthalene dicarboxylic acid, 1,4-naphthalene dicarboxylic acid, 2,3-naphthalene dicarboxylic acid, 1,8-naphthalene dicarboxylic acid.

Among acids (AL), mention can be notably made of oxalic acid (HOOC—COOH), malonic acid (HOOC—$CH_2$—COOH), succinic acid [HOOC—$(CH_2)_2$—COOH], glutaric acid [HOOC—$(CH_2)_3$—COOH], 2,2-dimethyl-glutaric acid [HOOC—$C(CH_3)_2$—$(CH_2)_2$—COOH], adipic acid [HOOC—$(CH_2)_4$—COOH], 2,4,4-trimethyl-adipic acid [HOOC—$CH(CH_3)$—$CH_2$—$C(CH_3)_2$—$CH_2$—COOH], pimelic acid [HOOC—$(CH_2)_5$—COOH], suberic acid [HOOC—$(CH_2)_6$—COOH], azelaic acid [HOOC—$(CH_2)_7$—COOH], sebacic acid [HOOC—$(CH_2)_8$—COOH], undecanedioic acid [HOOC—$(CH_2)_9$—COOH], dodecandioic acid [HOOC—$(CH_2)_{10}$—COOH], tetradecandioic acid [HOOC—$(CH_2)_{11}$—COOH], octadecandioic acid [HOOC—$(CH_2)_{16}$—COOH].

Preferably, the acid (DA) used for the manufacture of the polyamide (A) will be an acid (AL), as above detailed, possibly in combination with a minor amount of an acid (AR), as above detailed.

The amine (NN) is generally selected from the group consisting of aliphatic alkylene-diamine, aromatic diamines and mixtures thereof.

Said aliphatic alkylene-diamine are typically aliphatic alkylene diamines having 2 to 18 carbon atoms.

Said aliphatic alkylene diamine is advantageously selected from the group consisting of 1,2-diaminoethane, 1,2-diaminopropane, propylene-1,3-diamine, 1,3-diaminobutane, 1,4-diaminobutane, 1,5-diaminopentane, 1,5-diamino-2-methylpentane, 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diaminohexane, 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1.8-diamino-2,4-dimethyloctane, 1,8-diamino-3,4-dimethyloctane, 1.8-diamino-4,5-dimethyloctane, 1.8-diamino-2,2-dimethyloctane, 1.8-diamino-3,3-dimethyloctane, 1,8-diamino-4,4-dimethyloctane, 1,6-diamino-2,4-diethylhexane, 1,9-diamino-5-methylnonane, 1,11-diaminoundecane and 1,12-diaminododecane, 1,13-diaminotridecane.

The aliphatic alkylene diamine preferably comprises at least one diamine selected from the group consisting of 1,6-diaminohexane, 1,8-diamino-octane, 1,10-diaminodecane, 1,12-diaminododecane and mixtures thereof. More preferably, the aliphatic alkylene diamine comprises at least one diamine selected from the group consisting of 1,6-diaminohexane, 1,10-diaminodecane and mixtures thereof.

The aromatic diamine is preferably selected from the group consisting of meta-phenylene diamine, meta-xylylene diamine and para-xylylene diamine.

Preferably, the amine (NN) used for the manufacture of the polyamide (A) will be an aliphatic alkylene diamine, as above detailed, possibly in combination with a minor amount of an aromatic diamine, as above detailed.

Preferred mixtures (M1) are:

mixtures of adipic acid and 1,6-diaminohexane;
mixtures of adipic acid, terephthalic acid and 1,6-diaminohexane;
mixtures of sebacic acid and 1,6-diaminohexane.

Lactam (L) suitable for use for the manufacture of polyamide (A) can be any of β-lactam or ε-caprolactam.

Preferred mixture (M2) comprises ε-caprolactam.

Aminoacid (AN) suitable for use for the manufacture of polyamide (A) can be selected from the group consisting of 6-amino-haxanoic acid, 9-aminononanoic acid, 10-aminodecanoic acid, 11-aminoundecanoic acid, 12-aminododecanoic acid.

It is still within the scope of the invention the addition to any of mixtures (M1), (M2), (M3), and their combinations, of one or more than one polyfunctional acid/amine monomers comprising more that two carboxylic acid and amine groups, e.g. polycarboxylic acid having three or more carboxylic acid groups, polyamines having three or more amine groups, polyfunctional diacid including two carboxylic groups and one or more amine groups, polyfunctional diamine including two amine groups and one or more carboxylic acid groups. Incorporation of said polyfunctional acid/amine monomers generally lead to branched structures, star-like or tree-like, such as those notably described in WO 97/24388 (NYLTECH ITALIA [IT]) 10 Jul. 1997 and in WO 99/64496 (NYLTECH ITALIA [IT];) 16 Dec. 1999.

It is also further understood that one or more than one end capping agent [agent (M)] can be added to any of mixtures (M1), (M2), (M3), and their combinations for the manufacture of polyamide (A), without this departing from the scope of the invention. The agent (M) is generally selected from the group consisting of an acid comprising only one reactive carboxylic acid group [acid (MA)] and an amine comprising only one reactive amine group [agent (MN)].

Acid (MA) is preferably selected from the group consisting of acetic acid, propionic acid, butyric acid, valeric acid, caproic acid, caprylic acid, lauric acid, stearic acid, cyclohexanecarboxylic acid, benzoic acid, preferably from acetic acid and benzoic acid.

Amine (MN) is preferably selected from the group consisting of methylamine, ethylamine, butylamine, hexylamine, octylamine, benzylamine, aniline, toluidine.

The composition (C) will generally comprise at least 20% wt, preferably at least 30% wt, more preferably at least 35% wt of polyamide (A) as above detailed, with respect to the total weight of the composition (C). Still, the composition (C) comprises usually at most 90% wt, preferably at most 80% wt, even more preferably at most 70% wt of polyamide (A) as above detailed, with respect to the total weight of the composition (C).

The Polyamide (PA6)

As said, polyamide (PA6) is a polyamide different from polyamide (A), more than 50% moles of recurring units thereof being of formula —HN—(CH$_2$)$_5$—CO— [recurring units (R$_{PA6}$)].

Polyamide (PA6) may comprise recurring units (R$_{PA}$) different from recurring units (R$_{PA6}$) of any of formulae:

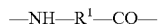     formula (j):

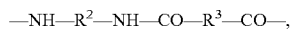,    formula (jj):

wherein:

R$^1$, equal to or different from each other at each occurrence, is a divalent hydrocarbon group having from 3 to 17 carbon atoms;

R$^2$, equal to or different from each other at each occurrence, is a divalent hydrocarbon group having from 2 to 18 carbon atoms.

Exemplary recurring units (R$_{PA}$) different from recurring units (R$_{PA6}$) of the polyamide (PA6) are notably:

(j) —HN—(CH$_2$)$_6$—NH—C(O)—(CH$_2$)$_8$—C(O)—, i.e. recurring units which can be notably obtained via polycondensation reaction of hexamethylene diamine and sebacic acid;

(jj) —NH—(CH$_2$)$_8$—CO—, i.e. recurring units which can be notably obtained via polycondensation raction of 9-aminononanoic acid;

(jjj) —NH—(CH$_2$)$_9$—CO—, i.e. recurring units which can be notably obtained via polycondensation raction of 10-aminodecanoic acid;

(jv) —NH—(CH$_2$)$_{10}$—CO—, i.e. recurring units which can be notably obtained via polycondensation raction of 11-aminoundecanoic acid;

(v) —NH—(CH$_2$)$_{11}$—CO—, i.e. recurring units which can be notably obtained via polycondensation raction of laurolactam;

(vj) —NH—(CH$_2$)$_6$—NH—CO—(CH$_2$)$_4$—CO—, i.e. recurring units which can be notably obtained via polycondensation reaction of hexamethylene diamine and adipic acid;

(vjj) —NH—(CH$_2$)$_6$—NH—CO—(CH$_2$)$_{10}$—CO—, i.e. recurring units which can be notably obtained via polycondensation reaction of hexamethylene diamine and dodecanoic acid (vjjj) —NH—(CH$_2$)$_6$—NH—CO—(CH$_2$)$_{12}$—CO—, i.e. recurring units which can be notably obtained via polycondensation reaction of hexamethylene diamine and tetradecandioic acid;

(jx) —NH—(CH$_2$)$_{10}$—NH—CO—(CH$_2$)$_{10}$—CO—, i.e. recurring units which can be notably obtained via polycondensation reaction of decamethylene diamine and dodecanoic acid;

(x) —NH—(CH$_2$)$_6$—NH—CO—(CH$_2$)$_7$—CO—, i.e. recurring units which can be notably obtained via polycondensation reaction of hexamethylene diamine and azelaic acid (otherwise known as nonandioic acid);

(xj) —NH—(CH$_2$)$_{12}$—NH—CO—(CH$_2$)$_{10}$—CO—, i.e. recurring units which can be notably obtained via polycondensation reaction of dodecamethylene diamine and dodecanoic acid;

(xjj) —NH—(CH$_2$)$_{10}$—NH—CO—(CH$_2$)$_8$—CO—, i.e. recurring units which can be notably obtained via polycondensation reaction of decamethylene diamine and decanoic acid.

(xjjj) —NH—(CH$_2$)$_4$—NH—CO—(CH$_2$)$_6$—CO—, i.e. recurring units which can be notably obtained via polycondensation reaction of 1,4-butanediamine and adipic acid;

(xjv) —NH—(CH$_2$)$_4$—NH—CO—(CH$_2$)$_8$—CO—, i.e. recurring units which can be notably obtained via polycondensation reaction of 1,4-butanediamine and sebacic acid.

More than 50% moles, preferably more than 60% moles, even more preferably more than 70% moles of recurring units of the polyamide (PA6) are recurring units (R$_{PA6}$), as above detailed.

Preferably the polyamide (PA6) consists essentially of recurring units (R$_{PA6}$), as above detailed, that is to say polyamide (PA6) is a homo-polyamide PA6, being understood that end-chain, defects and other irregularities can be present in the polyamide (PA6) chain, without this affecting the properties thereof.

The polyamide (PA6) is hence substantially free from chemically bonded polyhydric alcohol.

Preferably, polyamide (PA6) is a semi-crystalline polyamide having a melting temperature of at least 160° C., preferably at least 200° C., and/or of at most 250° C.

Polyamide (PA6) possesses preferably an apparent viscosity in the melt at 280° C. at 100 s$^{-1}$ of 10 to 1200 Pa×sec.

As said, the amount of polyamide (PA6) is of 5 to 50% wt, based on the combined weight of polyamide (A) and polyamide (PA6), and preferably of at least 7% wt, more preferably at least 10% wt and/or preferably of at most 45% wt, and more preferably of at most 40% wt, based on the combined weight of polyamide (A) and polyamide (PA6).

A proportion of polyamide (PA6) which has been found particularly effective is an amount of about 15 to about 35% wt, based on the combined weight of polyamide (A) and polyamide (PA6).

As a whole, thus, taking into account the usual content of polyamide (A), the composition (C) will comprise at least 1% wt, preferably at least 1.5% wt, more preferably at least 1.5% wt of polyamide (PA6), with respect to the total weight of the composition (C).

Still, the composition (C) comprises usually at most 30% wt, preferably at most 25% wt of polyamide (PA6) as above detailed, with respect to the total weight of the composition (C).

The Filler (F)

The composition comprises one or more than one filler (F).

Said filer (F) can be any reinforcement agent, but it is preferably selected from the group consisting of calcium carbonate, glass fibers, glass flakes, glass beads, carbon fibers, talc, mica, wollastonite, calcined clay, kaolin, diatomite, magnesium sulphate, magnesium silicate, barium sulphate, titanium dioxide, sodium aluminium carbonate, barium ferrite, potassium titanate.

The filler (F), from morphology perspective, can be hence selected from fibrous fillers and particulate fillers.

Preferably, the filler is chosen from fibrous fillers. Among fibrous fillers, glass fibers are preferred; they include chopped strand A-, E-, C-, D-, S- and R-glass fibers. Glass fibers with circular and non-circular cross sections can be used. The expression 'glass fibers with non-circula cross section' is used herein according to its usual meaning, that is to say it is intended to refer to glass fibers having a cross section having a major axis lying perpendicular to longitudinal direction of the glass fiber and corresponding to the longest linear distance in the cross-section, and a minor axis, corresponding to the linear distance in cross-section in a direction perpendicular to the major axis. The non-circular cross section of the fiber may have a variety of shapes including cocoon-type shape, a rectangular shape, an elliptical shape, a polygonal shape, an oblong shape, without this list being exhaustive. The ratio of the length of the major axis to the minor axis is preferably between about 1.5:1 to about 6:1, more preferably between about 2:1 to about 5:1, still more preferably between about 3:1 to about 4:1.

In preferred embodiments, circular cross-section glass fibers will be used as filler (F).

The composition (C) will comprise advantageously at least 5% wt, preferably at least 10% wt, more preferably at least 15% wt of filler (F), as above detailed, with respect to the total weight of the composition (C).

Still, the composition (C) comprises usually at most 65% wt, preferably at most 60% wt, even more preferably at most 50% wt of filler (F), as above detailed, with respect to the total weight of the composition (C).

Particularly good results have been obtained when the composition (C) comprised from about 10 to about 40% wt of filler (F), as above detailed, with respect to the total weight of the composition (C).

Optional Co-Stabilizers (S)

The composition (C) may also comprise one or more than one heat stabilizer or anti-oxidant, hereby referred to as 'co-stabilizer (S)'.

Co-stabilizers (S), when used in the composition (C) are generally selected from the group consisting of hindered amine compounds, hindered phenol compounds, phosphorous compounds and copper-containing stabilizers.

The expression "hindered amine compound" is used according to its customary meaning in this field and generally intended to denote derivatives of 2,2,6,6-tetramethyl piperidine well known in the art (see for example: *Plastics Additives Handbook*, 5th ed., Hanser, 2001). The hindered amine compound of the composition according to the present invention may either be of low or high molecular weight.

The hindered amine compounds of low molecular weight have typically a molecular weight of at most 900, preferably at most 800, more preferably of at most 700, still more preferably at most 600 and most preferably of at most 500 g/mol.

Examples of low molecular weight hindered amine compounds are listed in Table 1 below:

TABLE 1

| Formula |
| --- |
| (a1) |
| (a2) |
| (a3) |

TABLE 1-continued
Formula
(a4)
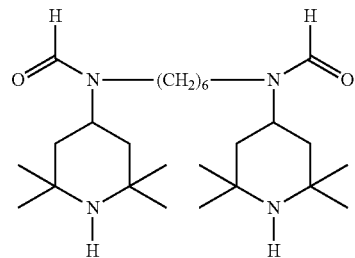
(a5)
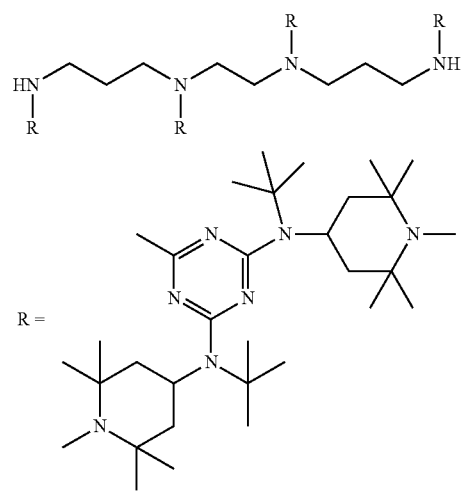
(a6)
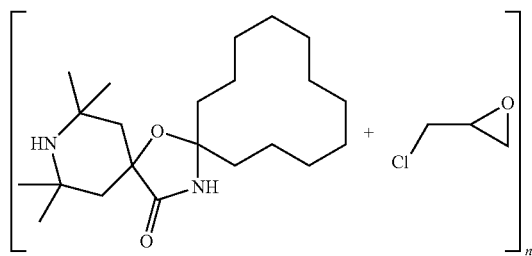
(a7)
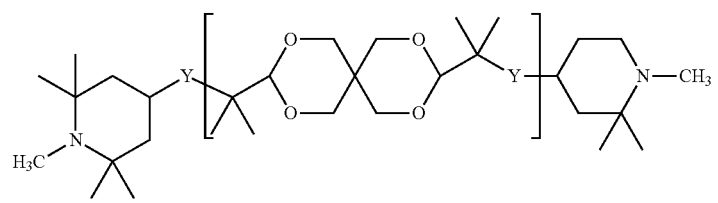

| Formula |
|---|
| 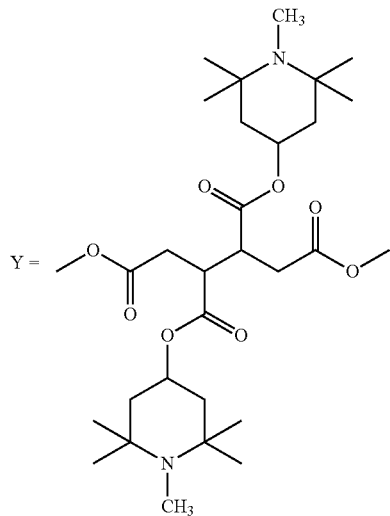 |
| (a8) 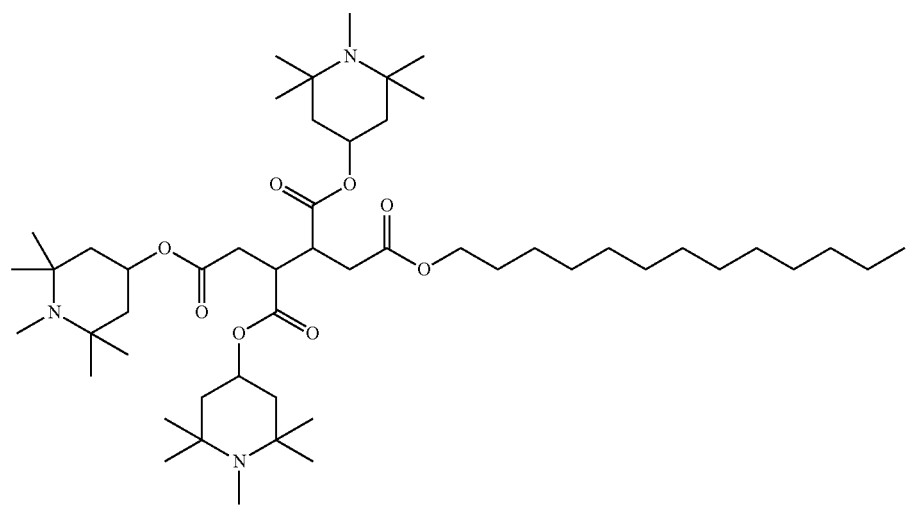 [SMILES: CCCCCCCCCCCCCOC(=O)CC(C(=O)OC1CC(C)(C)N(C)C(C)(C)C1)C(CC(=O)OC1CC(C)(C)N(C)C(C)(C)C1)C(=O)OC1CC(C)(C)N(C)C(C)(C)C1] |
| (a9) 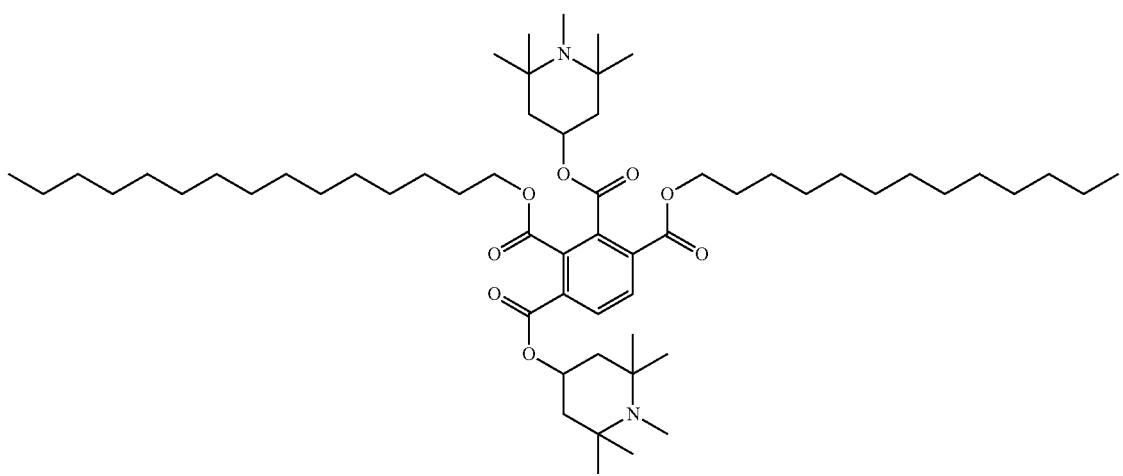 [SMILES: CCCCCCCCCCCCCCCOC(=O)c1c(C(=O)OC2CC(C)(C)N(C)C(C)(C)C2)ccc(C(=O)OCCCCCCCCCCCCC)c1C(=O)OC1CC(C)(C)N(C)C(C)(C)C1] |

TABLE 1-continued

Formula (a10)

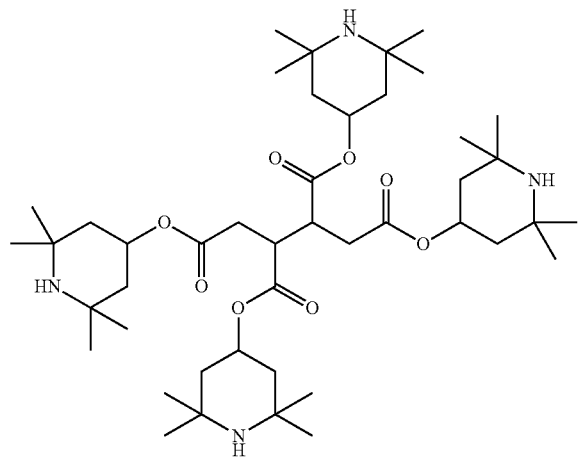

(a11)

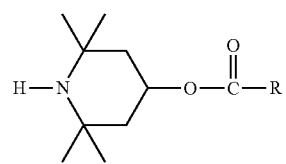

R = C₁₆—C₁₈

(a12)

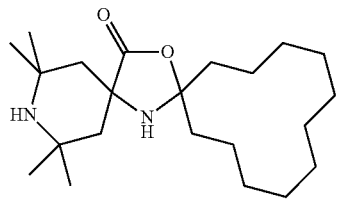 [SMILES: CC1(C)CC2(CC(C)(C)N1)NC1(CCCCCCCCCCC1)OC2=O]

Among those low molecular weight compounds, the hindered amine is preferably selected from the group consisting of the ones corresponding to formula (a1), (a2), (a11) and (a12). More preferably, the hindered amine is selected from the group consisting of the ones corresponding to formula (a1), (a2), and (a12). Still more preferably, the hindered amine is the one corresponding to formula (a2).

The hindered amine compounds of high molecular weight are typically polymeric and have typically a molecular weight of at least 1000, preferably at least 1100, more preferably of at least 1200, still more preferably at least 1300 and most preferably of at least 1400 g/mol.

Examples of high molecular weight hindered amine compounds are listed in Table 2 below:

TABLE 2

Formula (b1)

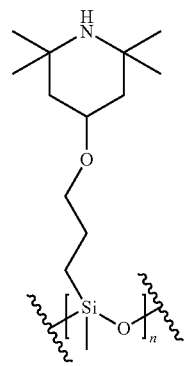

TABLE 2-continued
| Formula |
|---|
| (b2) 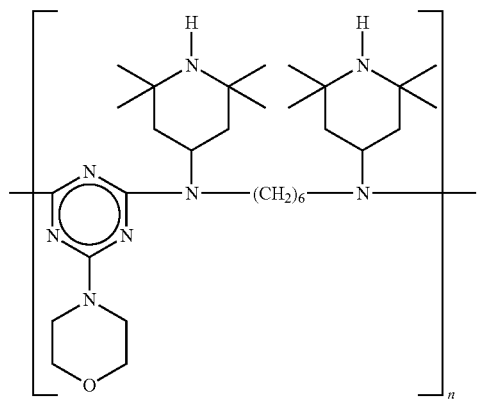 |
| (b3) 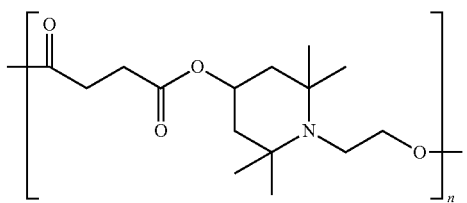 |
| (b4) 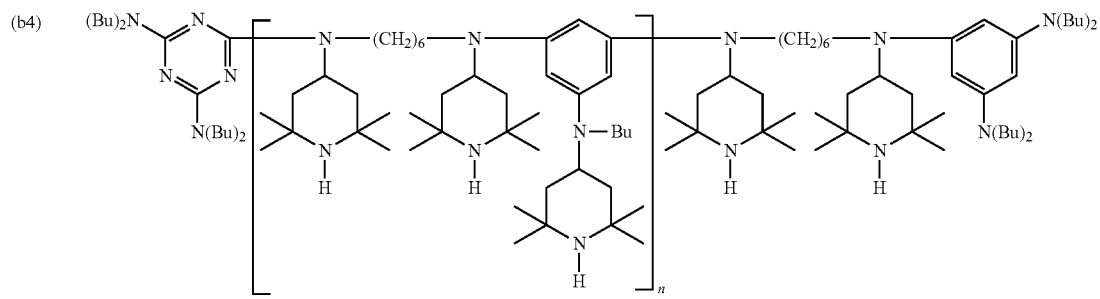 |
| (b5) 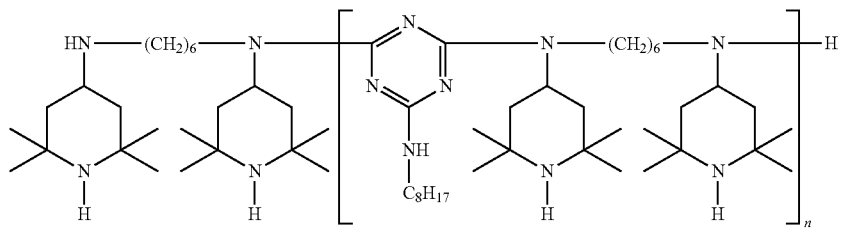 |
| (b6) 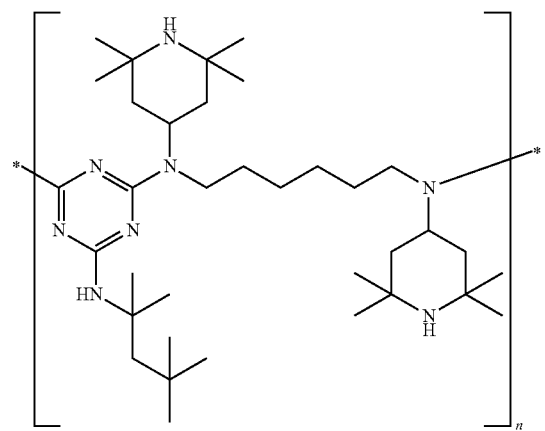 |

The "n" in the formulas (b1) to (b6) of Table 2 indicates the number of repeating units in the polymer and is usually an integral equal or greater than 4.

Among those high molecular weight compounds, the hindered amine is preferably selected from the group consisting of the ones corresponding to formula (b2) and (b5). More preferably, the high molecular weight hindered amine is the one corresponding to formula (b2).

If used, the hindered amine compound is typically present in an amount of advantageously at least 0.01 wt. %, more preferably at least 0.05 wt. %, still more preferably at least 0.1 wt. %, based on the total weight of the composition.

Similarly, when present, the hindered amine compound is also typically present in an amount of advantageously at most 3.5 wt. %, preferably at most 3 wt. %, more preferably at most 2.5 wt. %, still more preferably at most 2.0 wt. %, even more preferably at most 0.8 wt. % and most preferably at most 0.6 wt. %, based on the total weight of the composition.

The expression "hindered phenol compound" is used according to its customary meaning in this field and generally intended to denote derivatives of ortho-substituted phenol, especially (but not limited to) di-tert-butyl-phenol derivatives, well known in the art Examples of hindered phenol compounds are listed in Table 3 below:

TABLE 3

| | |
|---|---|
| (d1) tetrakis(3-(3,5-di-tert-butyl-4-hydroxy-phenyl)propionate), commercially available notably as Irganox® 1010 stabilizer from BASF | |
| (d2) Thiodiethylene bis[3-(3,5-di-tert.-butyl-4-hydroxy-phenyl) propionate], commercially available notably as Irganox® 1035 stabilizer from BASF | |
| (d3) Octadecyl-3-(3,5-di-tert.butyl-4-hydroxy-phenyl)-propionate, commercially available notably as Irganox® 1076 stabilizer from BASF | |
| (d4) N,N'-hexane-1,6-diylbis(3-(3,5-di-tert.-butyl-4-hydroxyphenylpropionamide)), commercially available notably as Irganox® 1098 stabilizer from BASF | |

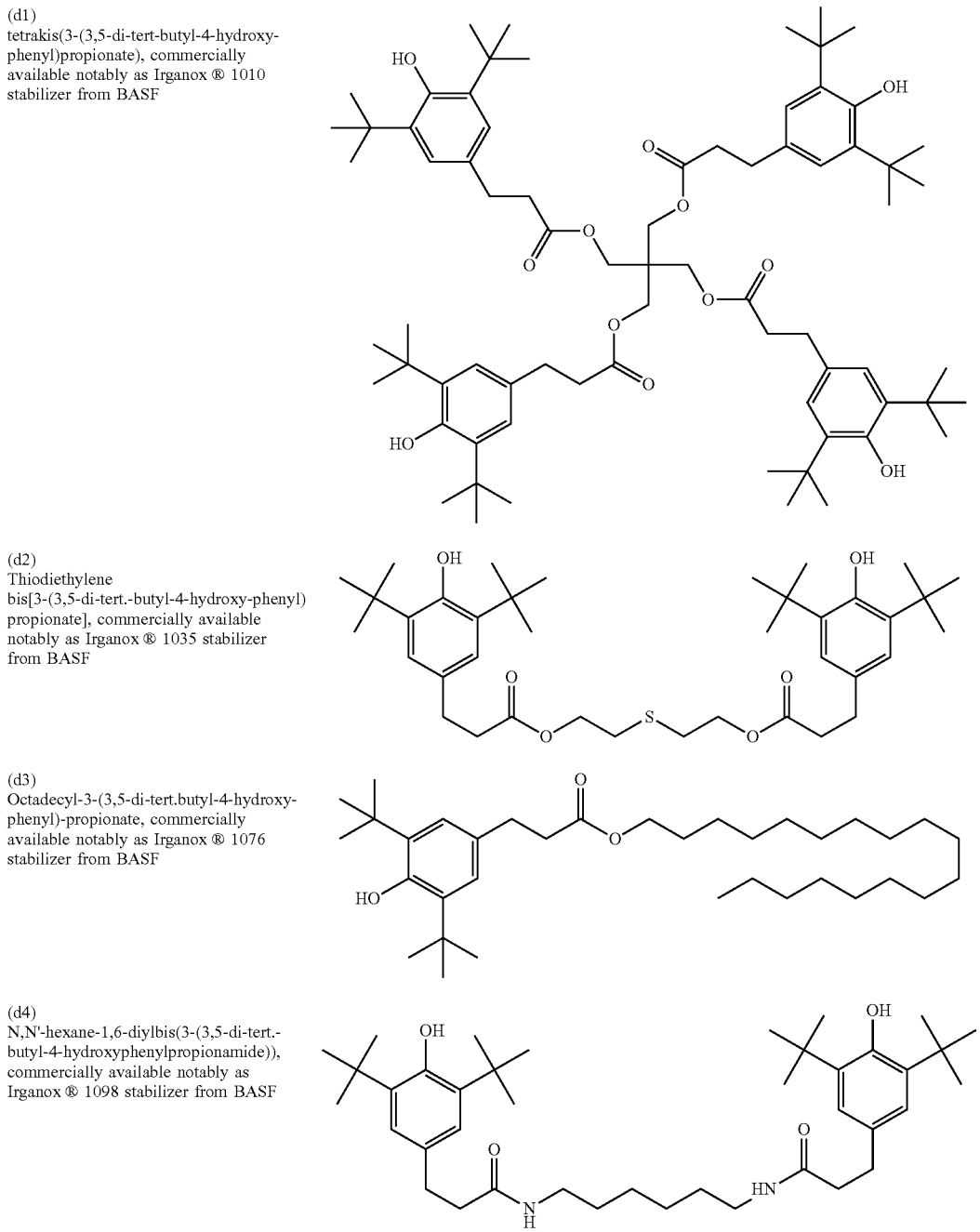

TABLE 3-continued (d5)
1,3,5-Trimethyl-2,4(6-tris(3,5-di-tert-butyl-4-hydroxybenzyl)benzene, commercially available notably as Irganox ® 1330 stabilizer from BASF

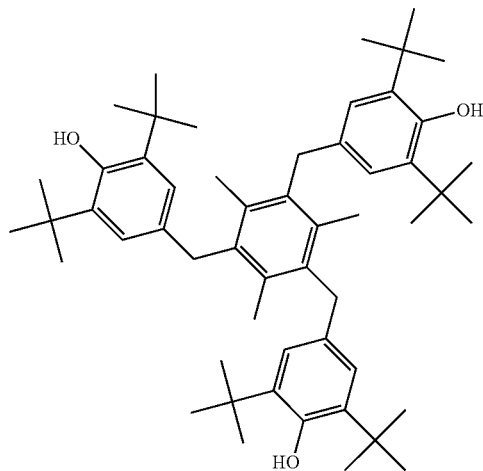 [SMILES: Cc1c(Cc2cc(C(C)(C)C)c(O)c(C(C)(C)C)c2)c(C)c(Cc2cc(C(C)(C)C)c(O)c(C(C)(C)C)c2)c(C)c1Cc1cc(C(C)(C)C)c(O)c(C(C)(C)C)c1]

(d6)
Benzenepropanoic acid, 3,5-bis(1,1-dimethylethyl)-4-hydroxy-, C7-C9 branched alkyl esters, commercially available notably as Irganox ® 1135 stabilizer from BASF

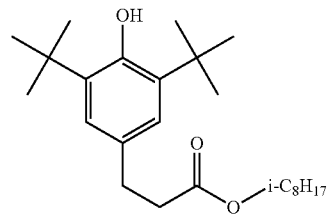

(d7)
Hexamethylene bis[3-(3,5-di-tert-butyl-4-hydroxyphenyl) propionate], commercially available notably as Irganox ® 259 stabilizer from BASF

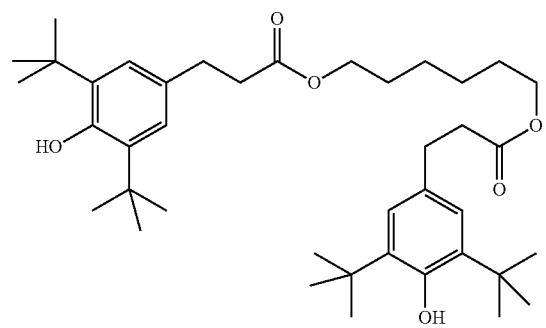 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

(d8)
Tris(3,5-di-tert-butyl-4-hydroxybenzyl) isocyanurate, commercially available notably as Irganox ® 3114 stabilizer from BASF

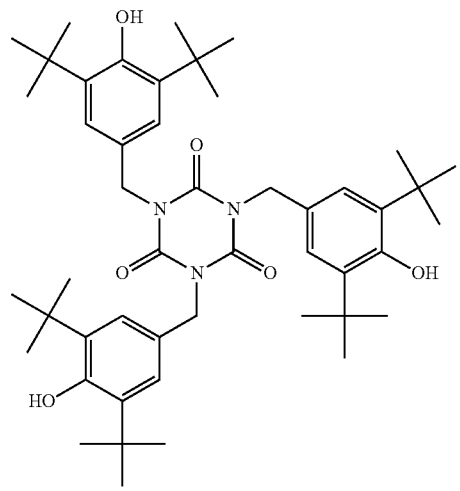 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE 3-continued (d9) 2,6-di-tert-butyl-4-(4,6-bis(octylthio)-1,3,5-triazin-2-ylamino)phenol, commercially available notably as Irganox ® 565 stabilizer from BASF

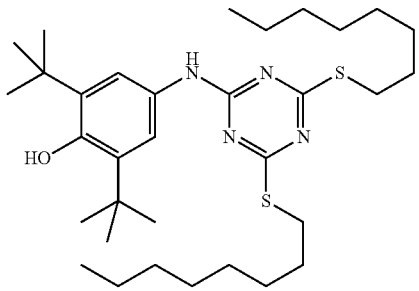 [SMILES: CCCCCCCCSc1nc(Nc2cc(C(C)(C)C)c(O)c(C(C)(C)C)c2)nc(SCCCCCCCC)n1]

(d10) commercially available notably as Irganox ® 1425 stabilizer from BASF

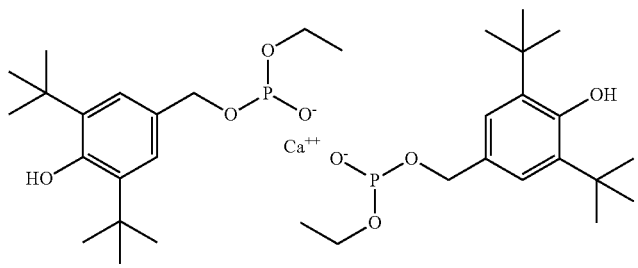 [SMILES: CCOP([O-])OCc1cc(C(C)(C)C)c(O)c(C(C)(C)C)c1 ; [Ca+2] ; CCOP([O-])OCc1cc(C(C)(C)C)c(O)c(C(C)(C)C)c1]

(d11) 2-Methyl-4,6-bis(octylsulfanylmethyl)phenol, commercially available notably as Irganox ® 1520 stabilizer from BASF

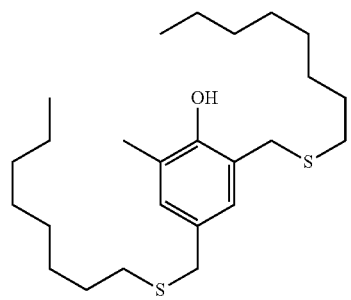 [SMILES: CCCCCCCCSCc1cc(C)c(O)c(CSCCCCCCCC)c1]

(d12) 2,4-Bis(dodecylthiomethyl)-6-methyl-phenol, commercially available notably as Irganox ® 1726 stabilizer from BASF

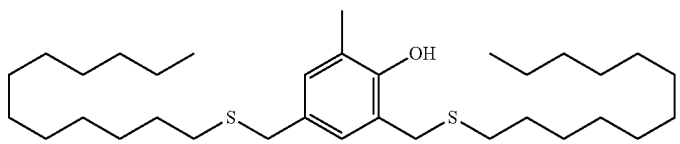 [SMILES: CCCCCCCCCCCCSCc1cc(C)c(O)c(CSCCCCCCCCCCCC)c1]

(d13) Triethylene glycol bis(3-tert-butyl-4-hydroxy-5-methyl-phenyl)propionate, commercially available notably as Irganox ® 245 stabilizer from BASF

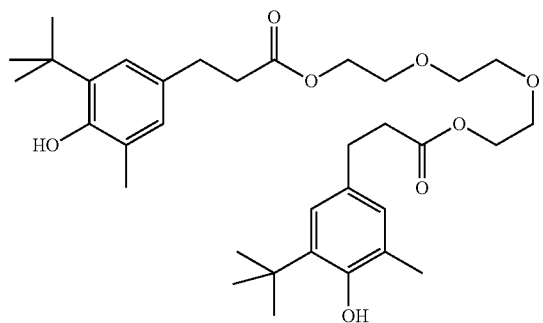 [SMILES: Cc1cc(CCC(=O)OCCOCCOCCOC(=O)CCc2cc(C)c(O)c(C(C)(C)C)c2)cc(C(C)(C)C)c1O]

A hindered phenol compound which has been found particularly effective in the composition (C) is N,N'-hexane-1,6-diylbis(3-(3,5-di-tert.-butyl-4-hydroxyphenylpropionamide)) of formula (d4), as above specified.

If used, the hindered phenol compound is typically present in an amount of advantageously at least 0.01 wt. %, more preferably at least 0.05 wt. %, still more preferably at least 0.1 wt. %, based on the total weight of the composition.

Similarly, when present, the hindered phenol compound is also typically present in an amount of advantageously at most 3.5 wt. %, preferably at most 3 wt. %, more preferably at most 2.5 wt. %, still more preferably at most 2.0 wt. %, even more preferably at most 0.8 wt. % and most preferably at most 0.6 wt. %, based on the total weight of the composition.

The co-stabilizers (S) may be at least one phosphorous compound selected from the group consisting of an alkali or alkali earth metal hypophosphites, phosphite esters, phosphonites and mixtures thereof.

Sodium and calcium hypophosphites are preferred alkali or alkali earth metal hypophosphites.

A phosphite ester may be represented by the formula $P(OR)_3$, while a phosphonite may be represented by the formula $P(OR)_2R$, wherein each of R, can be the same or different and are typically independently selected from the group consisting of a $C_{1-20}$ alkyl, $C_{3-22}$ alkenyl, $C_{6-40}$ cycloalkyl, $C_{7-40}$ cycloalkylene, aryl, alkaryl or arylalkyl moiety.

Examples of phosphite esters are listed in the Table 4 below:

TABLE 4

| Formula |
| --- |
| (e1) 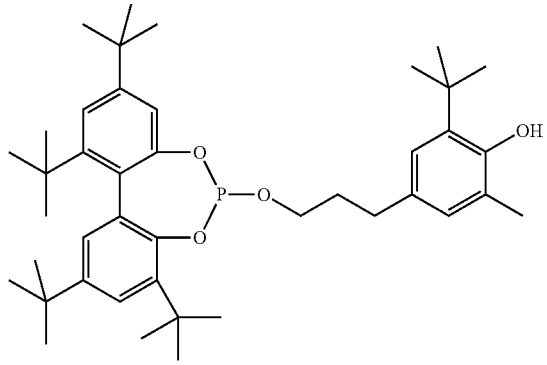 [SMILES: Cc1cc(CCCOp2oc3cc(C(C)(C)C)cc(C(C)(C)C)c3c3cc(C(C)(C)C)cc(C(C)(C)C)c3o2)cc(C(C)(C)C)c1O] |
| (e2) 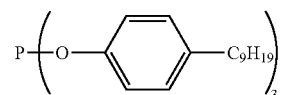 |
| (e3) 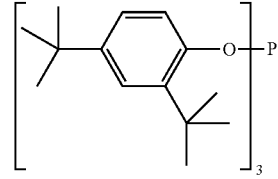 |
| (e4) 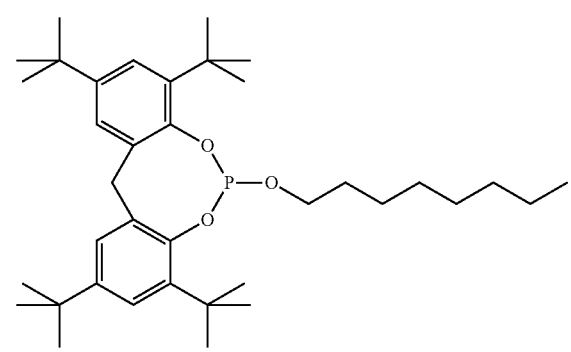 [SMILES: CCCCCCCCOP1Oc2c(cc(C(C)(C)C)cc2C(C)(C)C)Cc2cc(C(C)(C)C)cc(C(C)(C)C)c2O1] |
| (e5) 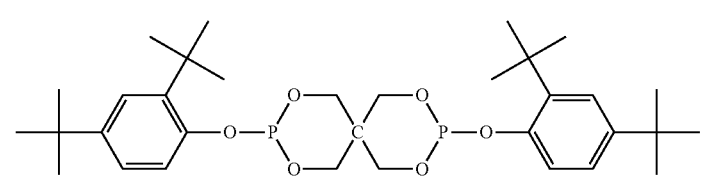 [SMILES: CC(C)(C)c1ccc(OP2OCC3(CO2)COP(Oc2ccc(C(C)(C)C)cc2C(C)(C)C)OC3)c(C(C)(C)C)c1] |
| (e6) 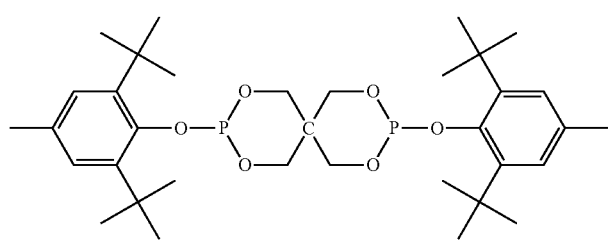 |

TABLE 4-continued
Formula
(e7)
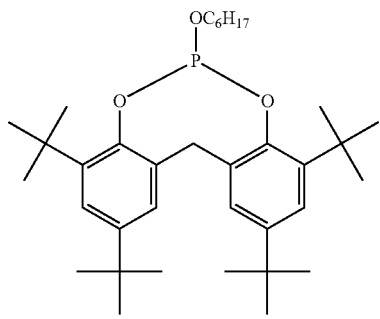
(e8)
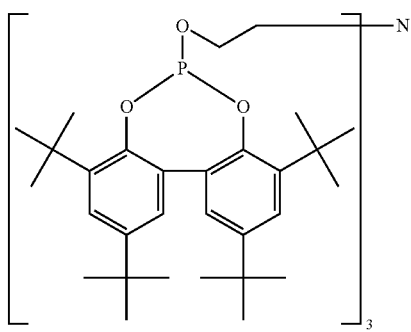
(e9)
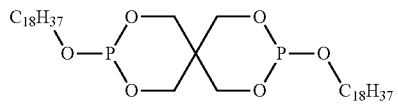
(e10)
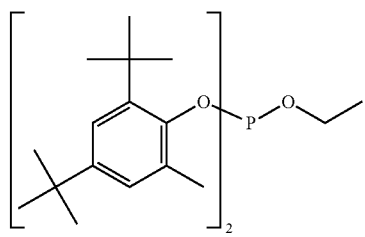
(e11)
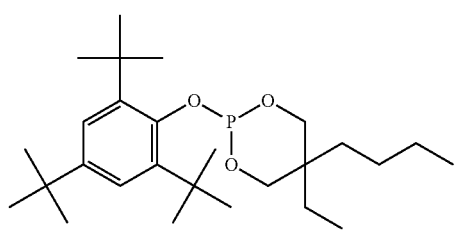 [SMILES: CCCCC1(CC)COP(Oc2c(C(C)(C)C)cc(C(C)(C)C)cc2C(C)(C)C)OC1]

TABLE 4-continued

| Formula | |
|---|---|
| (e12) | 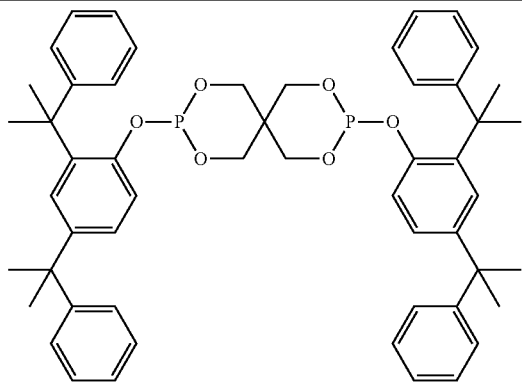 |

Examples of phosphonites are listed in the table 5 below:

TABLE 5

| Formula | Structure |
|---|---|
| (f1) | 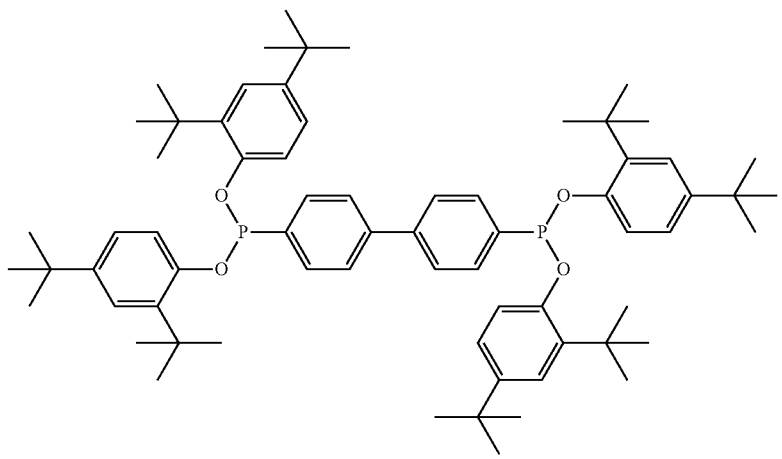 [SMILES: CC(C)(C)c1ccc(OP(Oc2ccc(C(C)(C)C)cc2C(C)(C)C)c2ccc(-c3ccc(P(Oc4ccc(C(C)(C)C)cc4C(C)(C)C)Oc4ccc(C(C)(C)C)cc4C(C)(C)C)cc3)cc2)c(C(C)(C)C)c1] |
| (f2) | 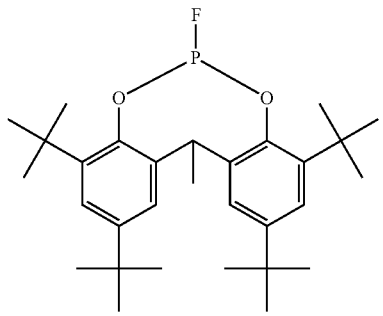 [SMILES: CC1c2cc(C(C)(C)C)cc(C(C)(C)C)c2OP(F)Oc2c1cc(C(C)(C)C)cc2C(C)(C)C] |

When used in the composition (C), the phosphorous compound is preferably present in an amount of at least 0.01 wt. %, more preferably at least 0.05 wt. %, based on the total weight of the composition.

The phosphorous compound is also preferably present in an amount of at most 1 wt. %, more preferably at most 0.5 wt. %, still more preferably at most 0.25 wt. %, based on the total weight of the composition.

Copper-containing stabilizers useful as co-stabilizers (S) in the practice of the invention may be characterized as comprising a copper compound and an alkali metal halide. More particularly, the copper-containing stabilizer will consist essentially of a copper compound [compound (Cu)] selected from the group consisting of copper (I) oxide, copper (II) oxide, copper (I) salt, for example cuprous acetate, cuprous stearate, a cuprous organic complex compound such as copper acetylacetonate, a cuprous halide or the like; and an alkali metal halide [halide (M)]. Preferably, the copper-containing stabilizer will consist essentially of a copper halide selected from copper iodide and copper bromide and the alkali metal halide will preferably be selected from the iodides and bromides of lithium, sodium and potassium.

A particularly preferred combination is the combination of CuI and KI.

The copper-containing stabilizer will preferably comprise a copper (I) compound [compound (Cu)] and an alkali metal halide [halide (M)] at a weight ratio compound (Cu):halide (M) of 1:99 to 30:70, preferably 5:95 to 20:80, more preferably 10:90 to 15:85. A weight ratio compound (Cu):halide (M) which has been found particularly effective is of about 0.15 (i.e. corresponding to about 13:87).

The combined weight of compound (Cu) and halide (M) in the composition (C), when present, will amount to from about 0.01 to about 2.5 wt %, preferably from about 0.1 to about 1.5 wt %, based on the total weight of composition (C).

The amount of the compound (Cu) in the copper-containing stabilizer, when used, will generally be sufficient to provide a level of from about 25 to about 1000 ppm, preferably of about 50 to about 500 ppm, more preferably of about 75 to about 150 ppm of Copper in the composition (C).

A significant advantage of the composition (C) of the invention is that high thermal stability is provided without the use of any of above mentioned co-stabilizers (S), and in particular in the absence of above recited copper-containing stabilizers.

According to certain embodiments, thus, the composition (C) is substantially free from copper-containing stabilizer, that is to say that the copper content of the composition (C) is of less than 25 ppm of elemental copper.

Impact Modifier (I)

According to certain embodiments, the composition (C) advantageously comprises at least one impact modifier (I) (also known in the art as a toughener).

Impact modifiers (I) suitable for use in the composition (C) generally comprise at least one functional group reactive with the polyamide (A), and more particularly with amine or carboxylic acid end groups of the polyamide (A) [functionalized impact modifier (IF)].

The functional group of the compound (IF) will generally selected from carboxylic acid groups and derivatives thereof (including notably salts and esters); epoxy groups; anhydride groups, oxazoline groups, maleimide groups or mixture thereof.

The functionalized impact modifier (IF) maybe an oligomer or polymer compound, wherein the functional groups can be incorporated by copolymerizing a functional monomer during polymerization of the impact modifier backbone or by grafting of a pre-formed polymer backbone.

Said functionalized impact modifiers (IF) generally comprise recurring units derived from at least one of the following monomers: ethylene; higher alpha olefins including propylene, butene, octene; dienes, including butadiene and isoprene; acrylates, styrene, acrylonitrile; (meth)acrylic acid and derivatives thereof, including esters; vinyl monomers, including vinyl acetate, and other vinyl esters. Other monomers maybe equally comprised in the structure of the compound (IF).

The polymer backbone of the compound (IF) will generally be selected from elastomeric backbones comprising polyethylenes and copolymers thereof, e.g. ethylene-butene; ethylene-octene; polypropylenes and copolymers thereof; polybutenes; polyisoprenes; ethylene-propylene-rubbers (EPR); ethylene-propylene-diene monomer rubbers (EPDM); ethylene-acrylate rubbers; butadiene-acrylonitrile rubbers, ethylene-acrylic acid (EAA), ethylene-vinylacetate (EVA); acrylonitrile-butadiene-styrene rubbers (ABS), block copolymers styrene ethylene butadiene styrene (SEBS); block copolymers styrene butadiene styrene (SBS); core-shell elastomers of methacrylate-butadiene-styrene (MBS) type, or mixture of one or more of the above.

It is understood that in case no functional group is comprised in said polymer backbone, the compound (IF) will further incorporate, by copolymerization or grafting, residues from functional monomers including any of carboxylic acid groups and derivatives thereof (including notably salts and esters); epoxy groups; anhydride groups, oxazoline groups, maleimide groups or mixture thereof. It is further envisioned that said functional monomers may be used for further modifying backbones which may already comprise a functional group.

Specific examples of compounds (IF) are notably terpolymers of ethylene, acrylic ester and glycidyl methacrylate, copolymers of ethylene and butyl ester acrylate; copolymers of ethylene, butyl ester acrylate and glycidyl methacrylate; ethylene-maleic anhydride copolymers; EPR grafted with maleic anhydride; styrene-maleimide copolymers grafted with maleic anhydride; SEBS copolymers grafted with maleic anhydride; styrene-acrylonitrile copolymers grafted with maleic anhydride; ABS copolymers grafted with maleic anhydride.

When the composition (C) comprises an impact modifier (I), the amount of said impact modifier (I) is generally of at least 2% wt, preferably at least 3% wt, more preferably at least 4% wt, with respect to the total weight of the composition (C). Still, when the composition (C) comprises an impact modifier (I), its amount is generally of at most 25% wt, preferably at most 15% wt, more preferably at most 10% wt, with respect to the total weight of the composition (C).

The Applicant has surprisingly found that when an impact modifier (I) is used, it is preferably to incorporate into the composition (C) a copper-containing stabilizer, as above detailed, in the above recited amounts. Without being bond by this theory, the co-stabilizer (S) will be required for ensuring stabilization of the impact modifier (I) itself.

Other Ingredients

The composition (C) may also comprise other conventional additives commonly used in the art, including lubricants, plasticizers, colorants, pigments, antistatic agents, flame-retardant agents, nucleating agents, catalysts, and the like.

Manufacture of the Composition (C)

The invention further pertains to a method of making the composition (C) as above detailed, said method comprising melt-blending the polyamide (A) and the polyamide (PA6) in the presence of the filler (F) and of any other optional ingredient.

Any melt-blending method may be used for mixing polymeric ingredients and non-polymeric ingredients of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing filler presents a long physical shape (for example, a long glass fiber), drawing extrusion molding may be used to prepare a reinforced composition.

Use of the Composition (C)

The composition (C), as disclosed above, is useful in increasing long-term thermal stability at high temperatures of molded or extruded articles made therefrom. The long-term heat stability of the articles can be assessed by exposure (air oven ageing) of 4 mm thick test samples at various test temperatures in an oven for various test periods of time. The oven test temperatures for the composition disclosed herein include 210° C. and up to 3000 hours test periods. The test samples, after air oven ageing, are tested for tensile strength and elongation to break, according to ISO 527-2/1A test method; and compared with unexposed controls having identical composition and shape, that are as molded. The comparison with the as molded controls provides the retention of tensile strength and/or retention of elongation to break, and thus the various compositions can be assessed as to long-term heat stability performance.

In various embodiments the composition (C) has a 210° C./3000 hours retention of tensile strength of at least 50% and preferably at least 60, 70, 80, and 90%, based upon comparison with as molded non-exposed controls.

In another aspect, the present invention relates a use of the above disclosed composition (C) for high temperature applications.

In yet another aspect, the present invention relates to a method for manufacturing an article by shaping the composition (C) of the invention. Examples of articles are films or laminates, automotive parts or engine parts or electrical/electronics parts. By "shaping", it is meant any shaping technique, such as for example extrusion, injection moulding, thermoform moulding, compression moulding or blow moulding. Preferably, the article is shaped by injection moulding or blow moulding.

The molded or extruded thermoplastic articles disclosed herein may have application in many vehicular components that meet one or more of the following requirements: high impact requirements; significant weight reduction (over conventional metals, for instance); resistance to high temperature; resistance to oil environment; resistance to chemical agents such as coolants; and noise reduction allowing more compact and integrated design. Specific molded or extruded thermoplastic articles are selected from the group consisting of charge air coolers (CAC); cylinder head covers (CHC); oil pans; engine cooling systems, including thermostat and heater housings and coolant pumps; exhaust systems including mufflers and housings for catalytic converters; air intake manifolds (AIM); and timing chain belt front covers. As an illustrative example of desired mechanical resistance against long-term high temperature exposure, a charge air cooler can be mentioned. A charge air cooler is a part of the radiator of a vehicle that improves engine combustion efficiency. Charge air coolers reduce the charge air temperature and increase the density of the air after compression in the turbocharger thus allowing more air to enter into the cylinders to improve engine efficiency. Since the temperature of the incoming air can be more than 200° C. when it enters the charge air cooler, it is required that this part be made out of a composition maintaining good mechanical properties under high temperatures for an extended period of time.

Should the disclosure of any patents, patent applications, and publications which are incorporated herein by reference conflict with the description of the present application to the extent that it may render a term unclear, the present description shall take precedence.

The present invention is further illustrated by the following examples. It should be understood that the following examples are for illustration purposes only, and are not used to limit the present invention thereto.

Analyses

Viscosity index (unit: mL/g) was determined in solution in formic acid according to ISO307 standard.

Carboxylic acid End-Groups (CEG) concentration and Amine End-Groups (AEG) concentration were determined by titration (unit: meq/kg).

Melting temperature ($T_m$) and enthalpy ($\Delta H_m$), crystallization temperature ($T_C$) were determined by Differential Scanning calorimetry (DSC), using a Perkin Elmer Pyris 1 at 10° C./min.

Free polyhydric alcohol content (unit: wt.-%) determination: Free DPE or TPE content in polyamide polymers and compounds was determined using an Agilent 1100 series HPLC (light scattering detector) with classical C18 column, calibrated with 5 different concentrations of DPE or TPE in TriFluoroEthanol/water 1/10 wt/wt solvent, following procedure as below detailed. About 2 g of polyamide-modified PHA pellets were solubilized in 30 g of trifluoroethanol+1 g/L of LiCl mixture at room temperature, and stirring was continued until all polyamide-modified PHA pellets were dissolved. Then 300 g of water were added dropwise (within about 30 min) while maintaining the mixture under stirring at room temperature, so as to ensure precipitation of the polyamide polymer chains. For free DPE content concentration determination, the stirring was further maintained during 60 min at room temperature. For free TPE content concentration determination, the solution was heated below 90° C. for 15 min so as to ensure solubilization of free TPE.

A specimen of the solution so obtained was injected, after filtration through a 0.45 µm filter, in the above mentioned HPLC instrument, and content was determined based on calibration curves.

Determination was repeated twice, and values reported are the average of the two measured values.

PREPARATIVE EXAMPLES—GENERAL POLYMERIZATION PROCEDURE

In a batch reactor were introduced the required amount of Nylon 66 salt (hexamethylene diammonium adipate), water and anti-foaming agent Silcolapse® 5020, in combination with appropriate amount of PHA and, when used, of additional monomers, and possibly of a hypophosphite catalyst. The polyamide was synthesized according to a standard process for the synthesis of PA 66, followed by a finishing step in conditions specified below. The polymer was then extruded under the shape of a strand, cooled in a cold water bath and pelletized to get pellets Ingredients and polymerization conditions are summarized in table 6 herein below.

TABLE 6

| Example | CPE1 | PE1 |
|---|---|---|
| Nylon66 salt (kg) | 80.0 | 92.56 |
| DPE(*) (kg) | — | 2.51 |
| Adipic acid (kg) | — | 1.73 |
| Water (kg) | 72.8 | 89.0 |
| NaH$_2$PO$_2$ (ppm P) | — | — |
| Anti-foaming agent (g) | 5.5 | 6.4 |
| Finishing temp. (° C.) | 275 | 275 |
| Finishing pressure (bar) | 1 | 1 |
| Finishing time (min) | 30 | 37 |

TABLE 6-continued

| Example | CPE1 | PE1 |
|---------|------|-----|
| IV (mL/g) | 137.5 | 139.2 |
| CEG (meq/kg) | N.M. | 121.4 |
| AEG (meq/kg) | N.M. | 35.4 |
| Tm (° C.) | 262 | 255 |
| ΔHm (J/g) | 67 | 55 |
| Chemically bonded PHA content (wt.-%) | — | 2.75 |
| Free PHA content (wt.-%) | — | 0.25 |

(*)DPE: dipentaerythritol

General Procedure for Extrusion of Compounds and High Heat Long Term Ageing Testing Before extrusion, pellets of the polyamides were dried to decrease water content below 1500 ppm. The compositions were obtained by melt blending of the selected ingredients in a WERNER&PLEIFEDER® ZSK 40 twin-screw extruder using the following parameters: 35 kg/hour, 280 rounds per minute, 8 heating zone set-points: 250, 255, 260, 260, 265, 270, 275, 280° C. All ingredients were fed at the beginning of the extruder. The extruded strand was cooled in a water bath, then pelletized and the obtained pellets were stored into sealed aluminium line bags to prevent moisture adsorption.

The polyamides manufactured as above specified were compounded with following ingredients:

Stabamid® 26AE2 PA66, which is a polyamide 66 commercially available from Solvay (IV=134 mL/g), having more carboxylic acids than amino end groups;

Polyamide PA6 S27 manufactured by Solvay by polymerizing caprolactam in the presence of acetic acid as end capping agent, having an IV=142 mL/g; and having following end groups: AEG=37 meq/kg; CEG=54 meq/kg;

Vetrotex OCV 983 Glass fibers from Owens Corning;

Lubricant, ethylene bis-stereamide;

dipentaerythritol (DPE)

The compositions were injection-molded using a DEMAG® 50T injection molding machine at 290° C. with a mold temperature of 80° C. to prepare 4 mm thick ISO527 samples. Before ageing, initial mechanical properties (E-modulus, tensile strength (TS) at break and strain at break) were determined by tensile measurements according to ISO 527/1 A at 23° C., as average values from 5 specimens.

The samples were heat aged in a re-circulating air oven (Heraeus TK62120) set at 210° C. At various heat ageing times (500 h, 1000 h, 2000 h and 3000 h), the samples were removed from the oven, allowed to cool to room temperature and placed into sealed aluminium lined bags until ready for testing. Mechanical properties were measured according to the same procedure as before ageing.

The retention of a mechanical property (tensile strength at break, E-modulus, strain at break) is expressed as the percentage of the ratio of the value of the mechanical property after a certain heat ageing time at the temperature T and the value of the mechanical property before ageing. For example, for a heat ageing time of 500 h at T, retention (TS) is expressed as percentage of TS(500 h,T)/TS(initial).

The ingredients and their reciprocal amounts in the compositions and the mechanical properties of the samples before and after air oven ageing are reported in Tables below.

TABLE 7

| | CE1 | CE2 | E1 | E2 |
|---|---|---|---|---|
| Ingredients | | | | |
| PA 66 26AE2 (wt.-%) | 62.7 | | | |
| PA from PE1 (wt.-%) | | 64.7 | 54.7 | 44.7 |
| PA6 S27 (wt.-%) | — | — | 10 | 20 |
| Glass fibers (wt.-%) | 35 | 35 | 35 | 35 |
| Lubricant (wt.-%) | 0.3 | 0.3 | 0.3 | 0.3 |
| Free DPE(§)(wt.-%) | 2 | — | — | — |
| Compound properties | | | | |
| Free PHA content (wt.-%)(#) | 2.03 | 0.13 | N.M. | N.M. |
| Bonded PHA content (wt.-%)(#) | — | 1.81 | N.M. | N.M. |
| Tensile modulus (MPa) | 12600 | 12490 | 12040 | 11890 |
| Tensile strength at break (TS$_B$)(MPa) | 210 | 220 | 210 | 212 |
| Tensile strain at break (%) | 2.6 | 2.99 | 3.16 | 3.20 |
| TS$_B$ (MPa)/retention (%) after 210° C. 500 h | 212/ 101 | N.M. | N.M. | N.M. |
| TS$_B$ (MPa)/retention (%) after 210° C. 1000 h | 186/ 89 | 175/ 80 | 184/ 87 | 191/ 91 |
| TS$_B$(MPa)/retention (%) after 210° C. 2000 h | 84/ 40 | 97/ 44 | 155/ 74 | 185/ 87 |
| TS$_B$(MPa)/retention (%) after 210° C. 3000 h | brittle | brittle | 103/ 49 | 191/ 90 |

(§)free DPE added during compounding.
(#)PHA (bonded/free) content with respect to the overall composition weight.

The dramatic effect of the addition of PA6 in compounds based on DPE-modified PA can be evidenced by comparing performances obtained in E1 and E2 over those obtained in CE3. The addition of PA6 improves significantly the thermal resistance. Up to 90% retention of tensile strength at break at 210° C. 3000 h was obtained with 20% of PA6 against no mechanical properties without PA6 at the same temperature and time of ageing.

The invention claimed is:

1. A filled polyamide composition, comprising:
   at least one polyhydric alcohol-modified polyamide, said polyhydric alcohol-modified polyamide comprising at least 0.1% wt, based on the total weight of the polyhydric alcohol-modified polyamide, of polyhydric alcohol residues chemically bonded at least to a part of the polyhydric alcohol-modified polyamide;
   at least one filler; and
   at least one second polyamide, wherein the second polyamide is different from the polyhydric alcohol-modified polyamide, more than 50 mole % of recurring units of the second polyamide are of formula —HN—(CH$_2$)$_5$—CO—, and the second polyamide is free from chemically bonded polyhydric alcohol and is present in an amount of from 5 to 50% wt, based on the combined weight of the polyhydric alcohol-modified polyamide and the second polyamide.

2. The composition of claim 1, wherein the polyhydric alcohol is selected from the group consisting of triols, tetraols, polyols comprising 5 hydroxyl groups, polyols comprising 6 hydroxyl groups, polyols comprising 8 hydroxyl groups, saccharide-type polyols, and mixtures thereof.

3. The composition of claim 2, wherein the polyhydric alcohol is dipentaerythritol.

4. The composition of claim 1, wherein the polyhydric alcohol-modified polyamide is obtained by condensation reaction in the presence of said at least one polyhydric alcohol of at least one monomer mixture selected from:

mixtures comprising at least a diacid or derivative thereof and at least a diamine or derivatives thereof;
mixtures comprising at least a lactam;
mixtures comprising at least an aminocarboxylic acid; and combinations thereof,
and wherein the amount of polyhydric alcohol used in the condensation reaction is from 0.15 to 20% wt, based on the total weight of the at least one monomer mixture.

5. The composition of claim 1, wherein the polyhydric alcohol-modified polyamide has a content of chemically bonded polyhydric alcohol residues of at least 0.5% wt, and/or of at most 10% wt each based on the total weight of the polyhydric alcohol-modified polyamide.

6. The composition of claim 1, wherein the polyhydric alcohol-modified polyamide comprises, if any, non-chemically bonded polyhydric alcohol in an amount of less than 2% wt each based on the weight of the polyhydric alcohol-modified polyamide.

7. The composition of claim 1, wherein the composition comprises at least 20% wt and/or at most 90% wt of the polyhydric alcohol-modified polyamide, each based on the total weight of the composition.

8. The composition of claim 1, wherein the second polyamide consists essentially of recurring units of formula —HN—(CH$_2$)$_5$—CO—.

9. The composition of claim 1, wherein the amount of the second polyamide is at least 7% wt, and/or at most 45% wt each based on the combined weight of polyhydric alcohol-modified polyamide and the second polyamide.

10. The composition of claim 1, wherein the filler comprises glass fibers and the composition comprises at least 5% wt and/or at most 65% wt, of filler each based on the total weight of the composition.

11. The composition of claim 1, further comprising a co-stabilizer selected from the group consisting of hindered amine compounds, hindered phenol compounds, phosphorous compounds and copper-containing stabilizers.

12. The composition of claim 1, further comprising at least one impact modifier.

13. A method of making the composition according to claim 1, comprising melt-blending the polyhydric alcohol-modified polyamide and the second polyamide in the presence of the filler and of any other optional ingredient.

14. A method for manufacturing an article, comprising shaping the composition according to claim 1, by a shaping technique selected from the group consisting of extrusion, injection moulding, thermoform moulding, compression moulding and blow moulding.

15. The method according to claim 14, wherein the article is any of films, laminates, automotive parts, engine parts and electrical/electronics parts.

16. The composition of claim 2, wherein the polyhydric alcohol comprises a triol selected from the group consisting of glycerol, trimethylolpropane, trimethylolbutane, 2,3-di (2'-hydroxyethyl)-cyclohexan-1-ol, hexane-1,2,6-triol, 1,1,1-tris(hydroxymethyl)ethane, 3-(2'-hydroxyethoxy)propane-1,2-diol, 3-(2'-hydroxypropoxy)-propane-1,2-diol, 2-(2'-hydroxyethoxy)-hexane-1,2-diol, 6-(2'-hydroxypropoxy)-hexane-1,2-diol, 1,1,1-tris-[(2'-hydroxyethoxy)-methylethane, 1,1,1-tris-[(2'-hydroxypropoxy)-methyl-propane, 1,1,1-tris-(4'-hydroxyphenyl)ethane, 1,1,1-tris-(hydroxyphenyl)-propane, 1,1,5-tris-(hydroxyphenyl)-3-methylpentane, trimethylolpropane ethoxylate, trimethylolpropane propoxylate, tris(hydroxymethyl)aminomethane, N-(2-hydroxy-1,1-bis(hydroxymethyl)ethyl)glycine, salts thereof, and mixtures thereof.

17. The composition of claim 2, wherein the polyhydric alcohol comprises a polyol selected from the group consisting of diglycerol, di(trimethylolpropane), pentaerythritol, 1,1,4-tris-(dihydroxyphenyl)-butane, triglycerol, dipentaerythritol, tripentaerythritol, cyclodextrine, D-mannose, glucose, galactose, sucrose, fructose, arabinose, D-mannitol, D-sorbitol, D- or L-arabitol, xylitol, iditol, talitol, altritol, gulitol, erythrol, threitol, D-gulono-1,4-lactone, and mixtures thereof.

18. The composition of claim 5, wherein the polyhydric alcohol-modified polyamide comprises from 0.75% wt to 7% wt chemically bonded polyhydric alcohol residues, based on the total weight of the polyhydric alcohol-modified polyamide.

19. The composition of claim 7, wherein the composition comprises from 30% wt to 80% wt of the polyhydric alcohol-modified polyamide, based on the total weight of the composition.

20. The composition of claim 9, wherein the composition comprises from 7% wt to 40% wt of the second polyamide, based on the combined weight of polyhydric alcohol-modified polyamide and the second polyamide.

* * * * *